Patented July 5, 1938

2,122,514

UNITED STATES PATENT OFFICE 2,122,514

AIR FILTERING MATERIAL

Ernest C. Crocker, Belmont, and Howard J. Billings, Acton, Mass., assignors to Arthur D. Little, Inc., a corporation of Massachusetts No Drawing. Application April 10, 1934, Serial No. 719,894

12 Claims. (Cl. 183—45)

Our invention relates to filters and filtering materials for use in filtering air and other gases. More particularly, it relates to materials or substances of an oily nature to which dust or the like will adhere, such substance being applied to glass wool or other material forming the base or supporting medium therefor.

Hitherto, the so-called adhesive or dust catching and retaining material used on filters has been typically a petroleum oil, more or less thickened by the solution therein of soaps or similar substances. Such a material is effective as a dust catcher and retainer, but suffers from two serious defects: first, oil drains slowly away from the fibrous base during a considerable portion of the life of the filter, making for unsightliness and fire hazard; and second, if flame reaches an air filter, serious fire may result from the combustion of the oily adhesive finely dispersed over the fibrous base.

Attempts to lessen this hazard have been made by use of very heavy oils, which are relatively less inflammable, though freely combustible when ignited. This results in lowered dust-collecting efficiency, for such heavy oils, by virtue of their extreme viscosity, are poor adhesives. Other attempts have been made to secure non-inflammability by the addition of highly-chlorinated organic compounds to oils of moderate viscosity. All of the truly flame-proof chlorinated compounds, such as the chlorinated naphthalenes and the chlorinated diphenyls, are themselves solids, and when used in sufficient amount to secure reasonable fire-proofness, render the oil a pasty solid which has very low dust-catching efficiency, and usually has decided odor.

An object of our invention is to overcome the above noted drawbacks to dust catching materials heretofore in use, and to provide a non-inflammable, odorless and inexpensive material to which dust will readily adhere and having a large capacity for holding dust and which, moreover, is adapted to be applied to glass wool or other fibrous materials used for air filters.

We have discovered that tricresyl phosphate, which is available commercially as "Lindol", is a material having the desirable properties hereinbefore set forth and adapted to the purposes of our invention. Tricresyl phosphate, although of relatively low viscosity, can, by the method of this invention, be caused to adhere firmly to the glass wool or other base of the filter. In carrying out this invention, we first prepare an aqueous emulsion of the tricresyl phosphate, using a suitable emulsifier such as common soda soap. Proportions of the ingredients may be varied to suit the particular requirements of each case; we have found that, for example, 100 parts by weight each of tricresyl phosphate and water, together with about 2 parts of soap, make a satisfactory emulsion. After applying the emulsion, by any desired means, to the glass wool or other base, the water contained in the emulsion is driven off. This results in the firm attachment of the tricresyl phosphate to the fibres of the base, by means of the soap or other emulsifying agent.

If tricresyl phosphate is used alone on glass wool or similar base, it does not adhere closely, and drains off more or less in the course of time, thereby damaging the product as regards both effectiveness and appearance. When applied in the manner of this invention, however, the tricresyl phosphate is dispersed in and on the emulsifying agent, and is well attached so that the tendency to drain away over a period of time is largely eliminated. The emulsifier should have this capacity to disperse and to hold the dust-catching medium, and should also be capable of coating or wetting the fibres of glass or other material instead of collecting along their length in a series of spaced droplets characteristic of materials which do not wet the glass.

The non-inflammable properties of the adhesive material are apparently due to its breakdown, when exposed to flame, whereby smoke or gases consisting largely of fully oxidized (and hence not further combustible) materials are produced. In the case of tricresyl phosphate (Lindol), this oxidized material is rich in $P_2O_5$ which apparently acts to blanket the flame and prevent it from spreading further.

In cases where flame-proof characteristics are of little importance, thin petroleum oils may be used in the same way and with practically the same effectiveness as tricresyl phosphate. Similarly, mixtures of the latter with such oils may be used, where some flame-resistance is desired.

We claim:

1. A filtering material comprising a fibrous base, and a coating of tricresyl phosphate.

2. A filtering material comprising a fibrous base, and a coating of tricresyl phosphate finely dispersed and firmly anchored to said base.

3. A filtering material comprising glass wool, and a coating of tricresyl phosphate anchored thereto.

4. The method which comprises emulsifying tricresyl phosphate with a water-soluble agent, applying the emulsion to a base of fibrous material, and driving off the water contained in the emulsion, leaving the tricresyl phosphate adhering as a coating to said fibrous base.

5. The method of forming a filtering material which comprises emulsifying tricresyl phosphate with a soda soap, applying the emulsion to a base of fibrous material, and driving off the water from said emulsion, leaving the tricresyl phosphate as a coating adhering to said fibrous material.

6. A filtering material comprising a base of glass wool, and a coating thereon of oily material comprising tricresyl phosphate finely dispersed and adhering to the wool.

7. A filtering material comprising a fibrous base, and a coating thereon of an ester of an acid of phosphorus.

8. A filtering material comprising a fibrous base, and a coating thereon comprising a mixture of petroleum oil and tricresyl phosphate.

9. A filter comprising a base, and a coating thereon of an ester of an acid of phosphorus.

10. A filter comprising a base, and a coating thereon of tricresyl phosphate.

11. A gas filtering material comprising a porous fibrous base, and a coating thereon of tricresyl phosphate.

12. A gas filter comprising a porous base, and a coating thereon of tricresyl phosphate.

ERNEST C. CROCKER.
HOWARD J. BILLINGS.